(12) United States Patent
Schropp, Jr.

(10) Patent No.: US 10,572,067 B2
(45) Date of Patent: Feb. 25, 2020

(54) INPUT SENSING USING CODE DIVISION MULTIPLEXING (CDM)

(71) Applicant: Synaptics Incorporated, San Jose, CA (US)

(72) Inventor: Donald R. Schropp, Jr., San Jose, CA (US)

(73) Assignee: Synaptics Incorporated, San Jose, CA (US)

(\*) Notice: Subject to any disclaimer, the term of this patent is extended or adjusted under 35 U.S.C. 154(b) by 0 days.

(21) Appl. No.: 16/132,773

(22) Filed: Sep. 17, 2018

(65) Prior Publication Data

US 2019/0302960 A1 Oct. 3, 2019

Related U.S. Application Data

(60) Provisional application No. 62/650,815, filed on Mar. 30, 2018.

(51) Int. Cl.
*G06F 3/041* (2006.01)
*H04J 13/00* (2011.01)
*G06F 3/044* (2006.01)

(52) U.S. Cl.
CPC ............ *G06F 3/0418* (2013.01); *G06F 3/044* (2013.01); *H04J 13/0003* (2013.01)

(58) Field of Classification Search
CPC ..... G06F 3/0418; G06F 3/044; H04J 13/0003
See application file for complete search history.

(56) References Cited

U.S. PATENT DOCUMENTS

| 8,937,606 B2 | 1/2015 | Sobel et al. |
| 9,001,072 B2 | 4/2015 | Sobel et al. |
| 9,285,902 B1* | 3/2016 | Kremin ............... G06F 3/044 |
| 9,639,733 B2 | 5/2017 | Kremin et al. |
| 2012/0013546 A1* | 1/2012 | Westhues ............ G06F 3/044 345/173 |

(Continued)

FOREIGN PATENT DOCUMENTS

WO WO 2015-112744 7/2015

OTHER PUBLICATIONS

International Search Report in International Patent Application No. PCT/US2019/022765, dated Jun. 13, 2019.

(Continued)

*Primary Examiner* — Nitin Patel
*Assistant Examiner* — Amy Onyekaba
(74) *Attorney, Agent, or Firm* — Leydig, Voit & Mayer, Ltd.

(57) ABSTRACT

Sensing systems and methods that utilize lower-order zero row sum code division multiplexing (CDM) drive matrices to reduce or eliminate radiative emissions. Measurements corresponding to an input received at a sensing region of the input device are obtained by separately driving multiple subsets of transmitters of the input device, and obtaining measurement values corresponding to each separately-driven subset of transmitters via the receivers, wherein a plurality of measurement iterations are performed for each separately-driven subset of transmitters, the plurality of measurement iterations corresponding to a zero row sum CDM drive matrix for the separately-driven subsets of transmitters. An image of the input is generated based on the obtained measurements.

21 Claims, 19 Drawing Sheets

(56) References Cited

U.S. PATENT DOCUMENTS

| | | | |
|---|---|---|---|
| 2012/0013565 A1* | 1/2012 | Westhues | G06F 3/0418 |
| | | | 345/174 |
| 2013/0033441 A1 | 2/2013 | Liu et al. | |
| 2013/0335252 A1* | 12/2013 | Roberson | G06F 3/0416 |
| | | | 341/173 |
| 2014/0092051 A1* | 4/2014 | Weinerth | G06F 3/044 |
| | | | 345/174 |
| 2015/0091838 A1* | 4/2015 | Tanemura | G06F 3/044 |
| | | | 345/174 |
| 2016/0148034 A1* | 5/2016 | Kremin | G06K 9/0002 |
| | | | 382/124 |
| 2016/0179276 A1 | 6/2016 | Nathan et al. | |
| 2016/0291718 A1* | 10/2016 | Cho | G06F 3/03547 |
| 2016/0291765 A1* | 10/2016 | Shen | G06F 3/0416 |
| 2016/0291766 A1* | 10/2016 | Shen | G06F 3/0416 |
| 2017/0177113 A1* | 6/2017 | Shen | G06F 3/044 |

OTHER PUBLICATIONS

Written Opinion of the International Searching Authority in International Patent Application No. PCT/US2019/022765, dated Jun. 13, 2019.

\* cited by examiner $$3: \begin{bmatrix} 0 & -1 & 1 \\ 1 & 0 & -1 \\ -1 & 1 & 0 \end{bmatrix} \quad M^T = -M$$

$$5: \begin{bmatrix} 0 & -1 & 1 & -1 & 1 \\ -1 & 0 & 1 & 1 & -1 \\ 1 & 1 & 0 & -1 & 1 \\ -1 & 1 & -1 & 0 & 1 \\ 1 & -1 & 1 & 1 & 0 \end{bmatrix} \quad M^T = +M$$

$$7: \begin{bmatrix} 0 & 1 & -1 & -1 & 1 & 1 & -1 \\ -1 & 0 & 1 & 1 & -1 & -1 & 1 \\ 1 & -1 & 0 & -1 & 1 & -1 & 1 \\ 1 & -1 & 1 & 0 & 1 & -1 & -1 \\ -1 & 1 & -1 & -1 & 0 & 1 & 1 \\ -1 & 1 & 1 & 1 & -1 & 0 & -1 \\ 1 & -1 & -1 & 1 & -1 & 1 & 0 \end{bmatrix} \quad M^T = -M$$

FIG. 5

CDM 1, 30mm Slug

INPUT SENSING USING CODE DIVISION MULTIPLEXING (CDM)

CROSS-REFERENCE TO RELATED APPLICATIONS

The present application claims the benefit under 35 U.S.C. § 119(e) of U.S. Provisional Application Ser. No. 62/650,815, filed Mar. 30, 2018, and titled "INPUT SENSING USING ZERO ROW SUM CODE DIVISION MULTIPLEXING (CDM) FOR RADIATED EMISSION SUPPRESSION," which is hereby incorporated by reference in its entirety.

TECHNICAL FIELD

The present disclosure generally provides systems and methods for input sensing using code division multiplexing (CDM).

BACKGROUND

Input devices, including touch sensor devices (also commonly called touchpads or proximity sensor devices), as well as fingerprint sensor devices, are widely used in a variety of electronic systems. Touch sensor devices typically include a sensing region, often demarked by a surface, in which the touch sensor device determines the presence, location, force, and/or motion of one or more input objects. Touch sensor devices may be used to allow a user to provide user input to interact with the electronic system. Fingerprint sensor devices also typically include a sensing region in which the fingerprint sensor device determines presence, location, motion, and/or features of a fingerprint or partial fingerprint. Finger print sensor devices may be used for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems such as opaque touchpads and fingerprint readers integrated in or peripheral to notebook or desktop computers. Touch sensor devices and fingerprint sensors are also often used in smaller computing systems such as touch screens integrated in mobile devices such as smartphones and tablets.

SUMMARY

According to an embodiment, a method of input sensing using an input device is provided. The method may include receiving, at a sensing region of the input device, an input, and obtaining, via receivers of the input device, measurements corresponding to the input, wherein obtaining the measurements comprises: driving multiple subsets of transmitters of the input device, and obtaining measurements corresponding to each driven subset of transmitters via the receivers, wherein a plurality of measurement iterations are performed for each driven subset of transmitters, the plurality of measurement iterations corresponding to a zero-row-sum code division multiplexing (CDM) drive matrix applied to the driven subsets of transmitters. The method may also include generating, by a processing system of the input device, an image of the input based on the obtained measurements. The multiple subsets of transmitters may be driven separately.

According to another embodiment, an input device for sensing a biometric object is provided. The input device may include a surface corresponding to a sensing region, wherein the sensing region is configured to receive an input, transmitters, configured to be driven with transmitter signals, and receivers, configured to obtain measurements corresponding to the input, wherein obtaining the measurements comprises: obtaining measurements corresponding to driven subsets of the transmitters via the receivers, wherein a plurality of measurement iterations are performed for each driven subset of the transmitters, the plurality of measurement iterations corresponding to a zero row sum code division multiplexing (CDM) drive matrix for the driven subsets of the transmitters. The input device may also include a processing system, configured to generate an image of the input based on the obtained measurements.

According to yet another embodiment, a non-transitory computer-readable medium having processor-executable instructions stored thereon is provided. The processor-executable instructions include instructions for performing input sensing using an input device. The processor-executable instructions, when executed by a processing system, enable the processing system to implement a method which includes obtaining, via receivers of the input device, measurements corresponding to an input received at a sensing region of the input device, wherein obtaining the measurements comprises: driving multiple subsets of transmitters of the input device, and obtaining measurements corresponding to each driven subset of transmitters via the receivers, wherein a plurality of measurement iterations are performed for each driven subset of transmitters, the plurality of measurement iterations corresponding to a zero row sum code division multiplexing (CDM) drive matrix for the driven subsets of transmitters, and generating an image of the input based on the obtained measurements.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

FIG. 5 illustrates examples of odd dimension matrices, according to one or more embodiments.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In one or more embodiments, input devices, including touch sensor devices and fingerprint sensor devices, utilize code division multiplexing (CDM) with respect to transmitter signals driven onto the transmitter electrodes, in order to enhance the signal level. In some embodiments, the CDM order, corresponding to the amount of transmitters being simultaneously driven, is equivalent to the total number of transmitter electrodes such that all transmitter electrodes are simultaneously driven for a plurality of imaging iterations. In other embodiments, lower-order CDM is used utilizing a fewer number of transmitter electrodes so as to provide for further various advantages including reduction in peak power, reduction in average power, reduction in sensor self-heating, and reduction in computational complexity. These advantages may be achieved in a flexibly configurable manner to meet the desired power specifications for various implementations of touch sensor devices and fingerprint sensor devices.

Figure 1:
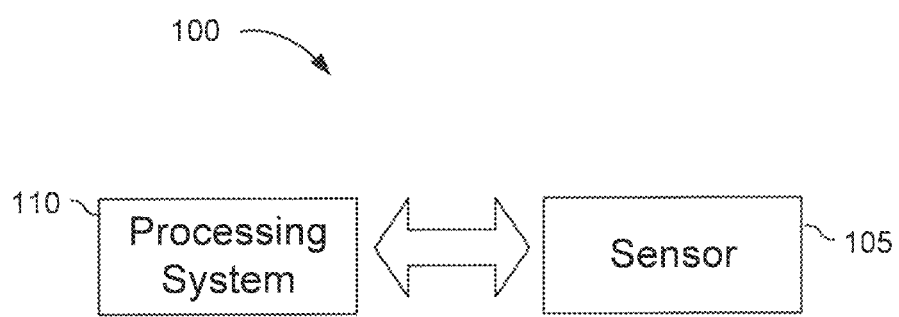
FIG. 1 is a block diagram depicting an example input device, according to one or more embodiments.

FIG. 1 is a block diagram depicting an example input device 100 according to one or more embodiments. The input device 100 may be configured to provide input to an electronic system (not shown for simplicity). As used in this document, the term "electronic system" or "electronic device" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit ($I^2C$), Serial Peripheral Interface (SPI), Personal System/2 (PS/2), Universal Serial Bus (USB), Bluetooth®, radio frequency (RF), and Infrared Data Association (IrDA).

In one or more embodiments, the input device 100 comprise one or more sensing elements for detecting user input. The input device 100 may include a sensor 105, which comprises one or more sensing elements configured to sense input provided by one or more input objects in a sensing region. Examples of input objects include fingers, styli, and hands. The sensing region may encompass any space above, around, in and/or near the sensor 105 in which the input device 100 is able to detect user input (e.g., user input provided by one or more input objects). The size, shape, and/or location of the sensing region may vary from embodiment to embodiment and depending on actual implementations. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary with the type of sensing technology used and/or the accuracy desired. Thus, some embodiments sense input that comprises no physical contact with any surfaces of the input device 100, contact with an input surface (e.g., a touch surface and/or screen) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements. In various embodiments, input surfaces may be provided by one or more surfaces of a casing or a housing of the input device 100.

The input device 100 may utilize various sensing technologies to detect user input in the sensing region. Example sensing technologies capacitive, elastive, resistive, inductive, magnetic, acoustic, ultrasonic, and/or optical techniques. In some embodiments, the input device 100 may utilize capacitive sensing technologies to detect user inputs. For example, a sensing region may include one or more capacitive sensing elements (e.g., sensor electrodes) to create an electric field by the applied voltage and/or current. The input device 100 may detect inputs based on changes in capacitance of the sensing elements. For example, an object in contact with (or close proximity to) the electric field may cause changes in the voltage and/or current in the sensing elements. Such changes may be detected as "signals" indicative of user input. The sensing elements may be arranged in arrays, or other regular or irregular patterns, or other configurations to detect inputs at multiple points within the sensing region. In some implementations, separate sensing elements may be ohmically shorted together to form larger sensor electrodes. Some other implementations may utilize resistive sheets, which may be uniformly resistive.

Some capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between one or more sensing elements and a substantially grounded touching object or object in proximity. For example, an input object near one or more sensing elements may alter the electric field near the sensing elements, thus changing the measured capacitive coupling between two or more sensor electrodes of the sensing elements. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance (or transcapacitive or trans-capacitive) sensing methods detect changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effects corresponding to one or more transmitter signals, and/or to one or more sources of environmental interference (e.g. other electromagnetic signals). Sensor electrodes may be dedicated transmitters or receivers, or may be configured to both transmit and receive.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. The placement sensor may include a two dimensional array of sensing elements capable of capturing a desired area of the fingerprint in a single frame. In a swipe sensor implementation, the sensor is configured to capture to a fingerprint input based on relative movement between the user's finger and the sensing region. The swipe sensor may include a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some example imaging areas for partial placement sensors include an imaging area of 100 $mm^2$ or less. In another example embodiment, a partial placement sensor has an imaging area in the range of 20-50 $mm^2$. In some implementations, the partial fingerprint sensor has an input surface that is the same size the imaging area.

Referring back to FIG. 1 according to one or more embodiments, the input device 100 includes a processing system 110 as shown. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system may be configured to drive transmitter signals onto transmitter sensor electrodes of the sensor 105, and/or receive resulting signals detected via receiver sensor electrodes of the sensor 105.

The processing system 110 may include a non-transitory computer-readable medium having processor-executable instructions (such as firmware code, software code, and/or the like) stored thereon. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic light-emitting diode (LED) display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
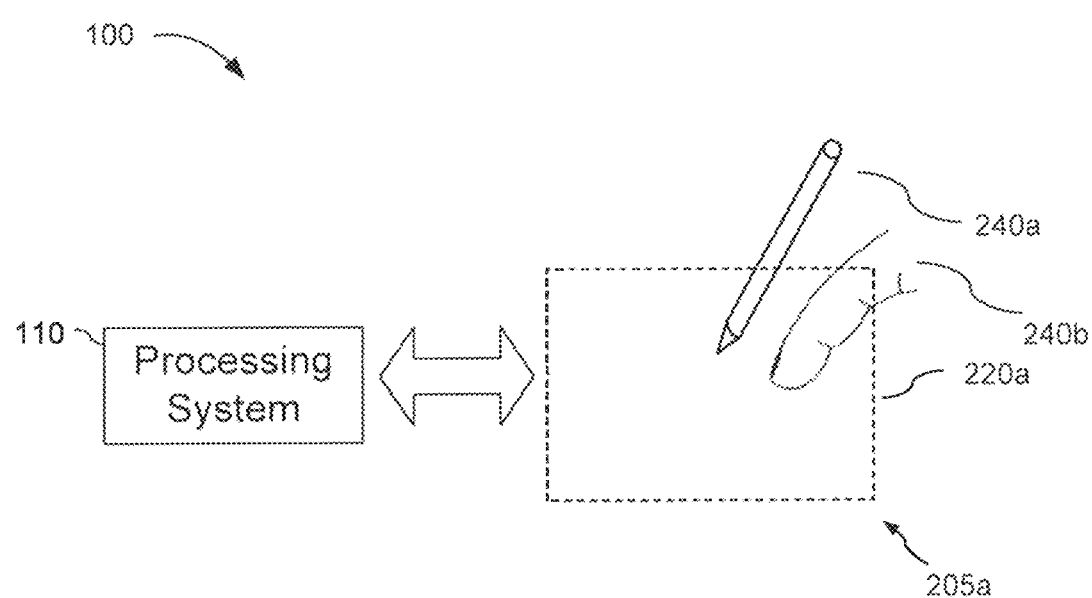
FIGS. 2A-2B are block diagrams depicting further example input devices, according to some embodiments.
Figure 2B:
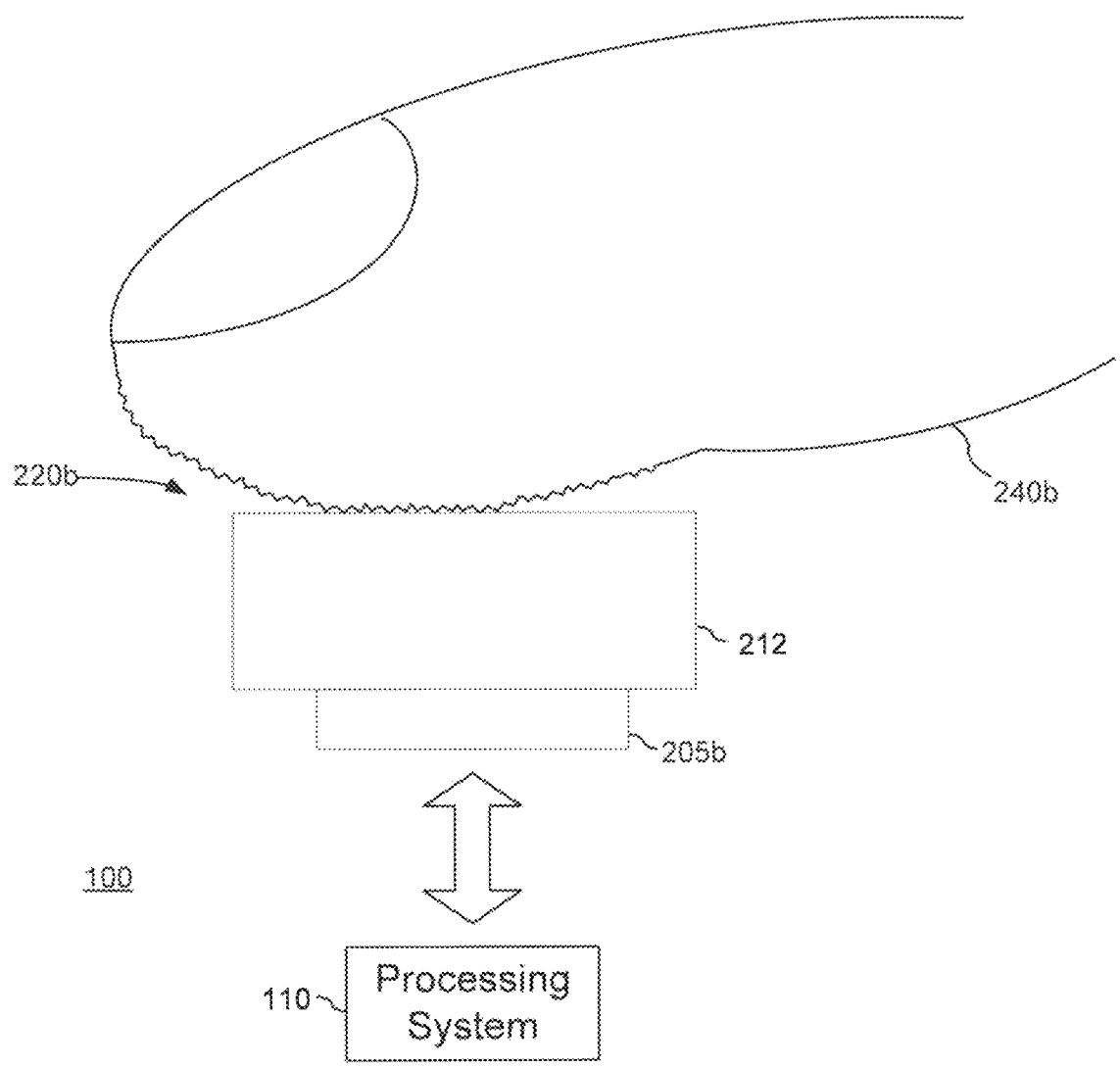

FIGS. 2A-2B are block diagrams depicting further input devices according to some embodiments. In FIG. 2A, the input device 100 is shown as including a touch sensor 205a. The touch sensor 205a is configured to detect position information of an input object within the sensing region 220a, according to an embodiment. The input object may include a finger 240b or a stylus 240a, as shown in FIG. 2A. The sensing region 220a may include an input surface having a larger area than the input object. The touch sensor 205a may include an array of sensing elements with a resolution configured to detect a location of a touch to the input surface. The input device 100 may also be configured to detect presence, force, and/or motion of an input object with the touch sensor 205a. The input object may include more than one object.

In FIG. 2B, the input device 100 is shown as including a fingerprint sensor 205b. The fingerprint sensor 205b is configured to capture a fingerprint from a finger 240b. In one embodiment, the fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b may have an array of sensing elements with a resolution configured to detect surface variations of the finger 240b, and the fingerprint sensor 205b has a higher resolution than the touch sensor 205a of FIG. 2A.

Figure 3:
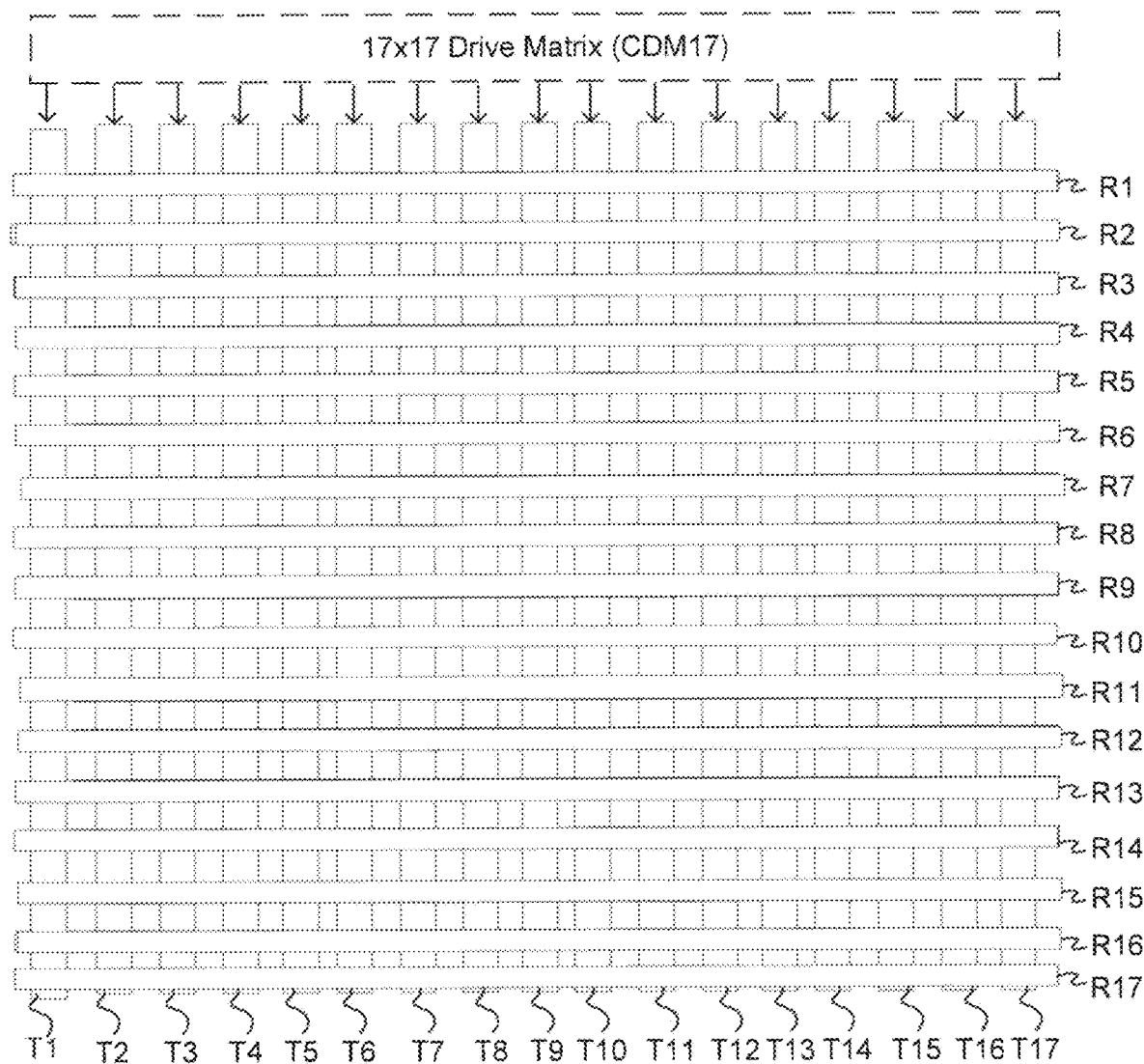
FIG. 3 depicts an orthogonal grid of transmitter electrodes and receiver electrodes of an input device according to one or more embodiments.

FIG. 3 depicts an orthogonal 17×17 grid of transmitter electrodes T1-T17 and receiver electrodes R1-R17 of an input device according to one or more embodiments. In FIG. 3, the input device is being driven by a 17×17 drive matrix. It will be appreciated that a 17×17 grid is shown for illustrative purposes, but that various implementations of an input device may be of any size, having even or odd numbers of electrodes—including, for example, 15×15, 17×17, 31×31, 56×96, 80×80, 88×116, 56×144, 72×80, and other electrode grid sizes. It will further be appreciated that although a grid with transmitter electrodes and receiver electrodes orthogonal to one another in a bars and stripes configuration is used herein as an example, other example implementations of a transcapacitive input device may utilize other configurations of transmitter electrodes and receiver electrodes—including, for example, single-layer configurations with interdigitated electrodes, matrix configurations where each pixel corresponds to an electrode plate, orthogonal diamond configurations, etc. It will be appreciated that although the illustrative example discussed in this embodiment is provided in the context of a transcapacitive input device, the principles described in this embodiment and others may also be applied to other types of input devices, such as acoustic or ultrasonic input devices, or other device that also utilizes transmitters and receivers.

As shown in FIG. 3, the transmitter electrodes T1-T17 are driven according to a CDM technique where the CDM order is 17 (CDM17) with all transmitter electrodes T1-T17 being simultaneously driven with different codings, each having a same row sum, over 17 imaging iterations (corresponding to a 17×17 drive matrix). Thus, with all of transmitter electrodes T1-T17 being driven 17 times, this would result in relatively high peak power, average power, sensor self-heating, and computational complexity. The information captured through this CDM technique is then decoded using the inverse (for a non-zero row sum drive matrix) or transpose (for a zero row sum drive matrix) of the drive matrix to obtain an image corresponding to an input.

Certain sensor applications, such as in automotive subsystems, may have a very stringent set of electromagnetic radiation emission requirements they may not exceed; one such standard is CISPR25 [*Comité International Spécial des Perturbations Radioélectriques*, English: International Special Committee on Radio Interference]. The CISPR25 standard includes emission limits versus frequency and has three measurement limits versus frequency as measured on a spectrum analyzer: peak, quasi-peak and average. In some embodiments, a capacitive touch sensing system used in a vehicle may inherently radiate because the touch sensing system detects a finger by changing voltages on the sensor electrodes and measuring changes in capacitance on those electrodes. Every electrode may become an antenna and may emit radiation. When CDM schemes are introduced to increase the signal-to-noise ratio, the radiated emissions may further increase according to the row sum of the driving CDM matrix.

Figure 4A:
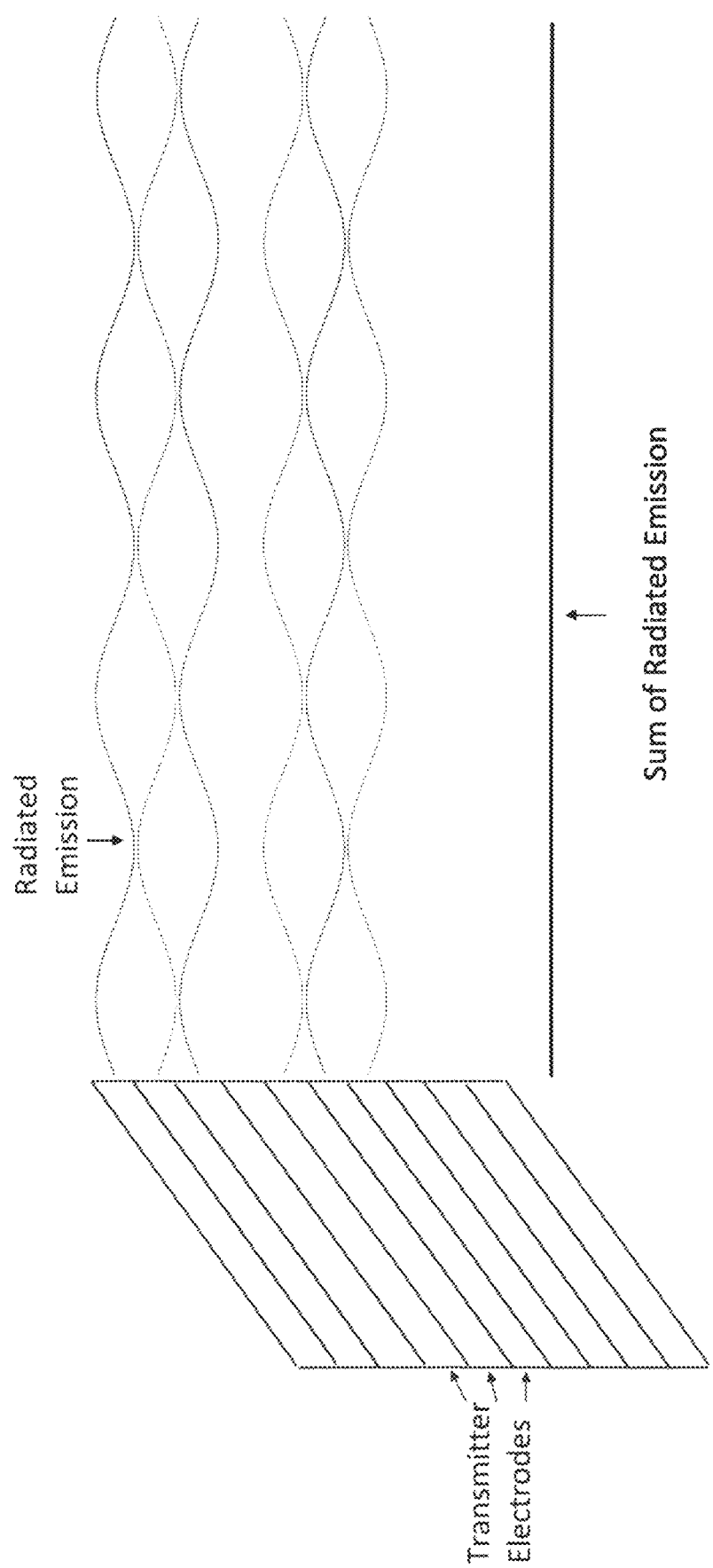
FIG. 4A illustrates an example of zero row sum CDM for radiated emission mitigation, according to one or more embodiments.
Figure 4B:
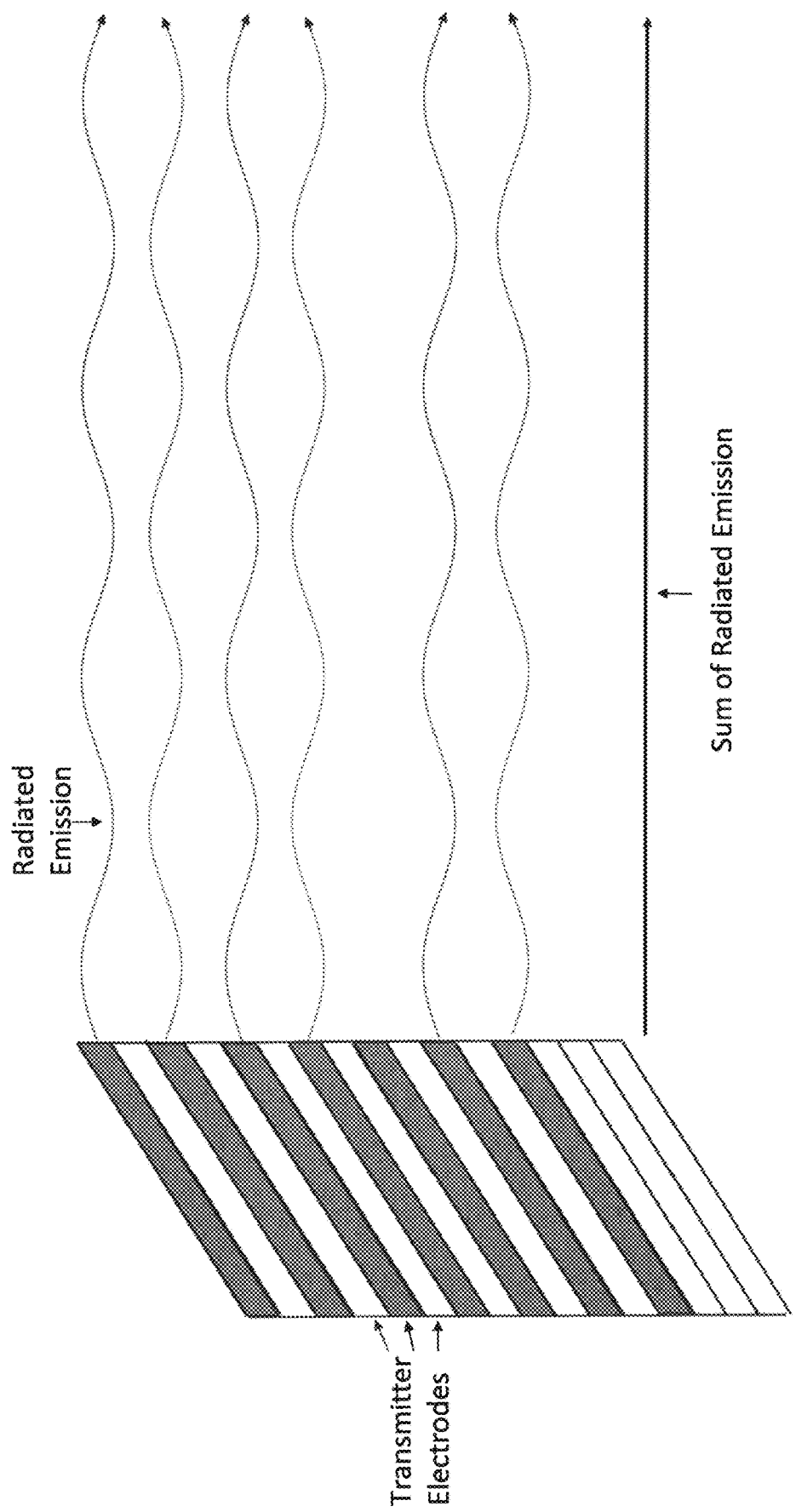
FIG. 4B illustrates an example of interleaved zero row sum CDM for radiated emission mitigation, according to one or more embodiments.

In an embodiment, zero row sum matrices are used to drive sensor electrodes to allow deconvolution of the raw measurements to recover the original signals on each electrode to within an arbitrary constant, which can be conveniently set to provide a zero amplitude baseline in a 2D image. Zero row sum matrices have the desirable property that the sum of the emissions from the active (driven) set in the CDM pattern sum to zero, which means the emitted radiation from half of the active transmitters radiate or couple 180° out of phase with the other half of the active transmitters and the net radiated emission is zero or negligible as shown in FIG. 4A and FIG. 4B. FIG. 4A shows an example of zero row sum CDM. In particular, a single drive iteration is shown using a zero row sum CDM7 matrix to drive a contiguous subset of 7 transmitter electrodes. Note that the middle ($4^{th}$) electrode of the 7 driven electrodes is not transmitting (0) for the particular drive iteration shown. FIG. 4B shows an example of interleaved zero row sum CDM using a CDM7 matrix to drive non-contiguous transmitter electrodes as will be discussed in more detail below. In the specific drive iteration shown in FIG. 4B, every other transmitter electrode is driven using CDM7, wherein the non-driven transmitter electrode ($5^{th}$ from top in example shown) may be driven in a subsequent CDM drive iteration.

A class of odd dimension matrices have the elegant property, namely $$\vec{M}^T \vec{M} = d\vec{I} - \overrightarrow{\text{Ones}}.$$

That is, driving a 2-dimensional (2D) transcapacitive image sensor with a suitable matrix, M, then deconvolving the acquired data with the transpose of that matrix yields the dimension of the matrix times the transmitter's row data minus the average of all the rows' data in the CDM set. This recognition increases flexibility for driving sensors having odd numbers of transmitters.

Lowering radiated emissions is important for simultaneously performing touch sensing and meeting automotive radiated emission specifications/standards. When using square wave waveforms, there is an infinite number of harmonics and many fall within frequency bands where radiated emission limits exist. Using Zero Row Sum driving matrices reduce those harmonics as well. Even using sine wave sensing, reducing the emissions at that single frequency may still be needed depending on particular requirements and possible future modifications to the international specifications.

In certain embodiments, CDM matrices M have the three properties:
1. The matrix elements are from the set {−1, 0, +1};
2. The sum of each row is zero, i.e., $\Sigma_j M_{ij}=0$; and
3. The transpose of M times M has the relationship:

$$\frac{M^T \cdot M}{d} = I - \frac{\begin{bmatrix} 1 & \cdots & 1 \\ \vdots & \ddots & \vdots \\ 1 & \cdots & 1 \end{bmatrix}}{d} == I - I \cdot \frac{1}{d}\sum_i pixel_i == I - I \cdot \langle pixel_i \rangle \quad \text{(Eq. 1)}$$

where d is the dimension of the CDM matrix M and $\langle pixel_i \rangle$ is the average of the pixels within the CDM group.

Examples of odd dimension matrices of dimensions 3, 5 and 7 are shown in FIG. 5. The odd zero row sum matrices furthermore possess the property that the transpose of M is plus or minus the matrix M according to the dimension d, i.e., if (d−1)/2 is even then $M^T$=M, if (d−1)/2 is odd $M^T$=−M.

Figure 6:
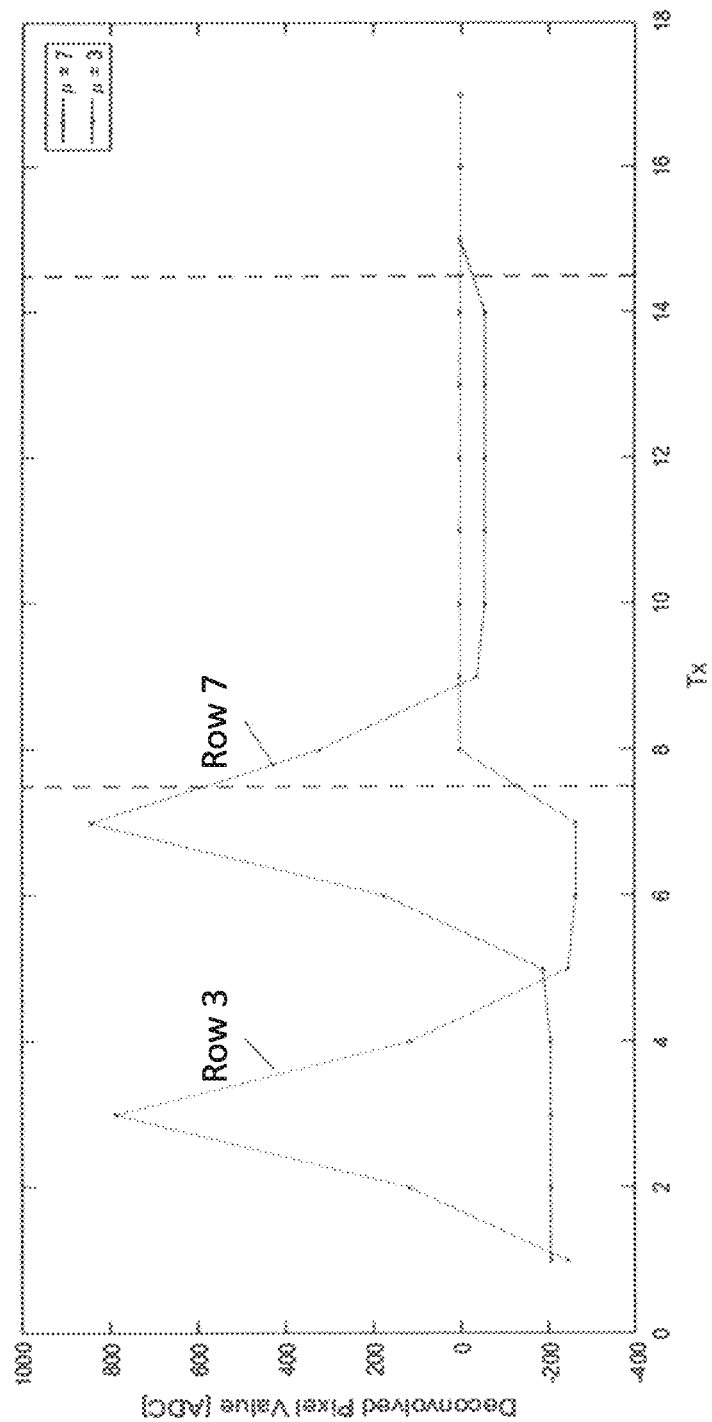
FIG. 6 shows raw deconvolved profiles of CDM7 applied to a sensor with 17 transmitters, according to one or more embodiments.

If the right hand side of Eq. 1 is averaged over the pixels (the i index) it is identically 0. That property implies that each CDM group's resulting values average (and sum) to zero, so if multiple CDM groups are required for a larger sensor, the complete deconvolved profile of an object touching may have discontinuities. As an example, using the CDM7 matrix of FIG. 5 on a touch sensor with 17 transmitter rows (see, e.g., FIG. 3) with a finger placed proximal to row 7 or 3 yields deconvolved profiles as shown in FIG. 6.

Figure 7:
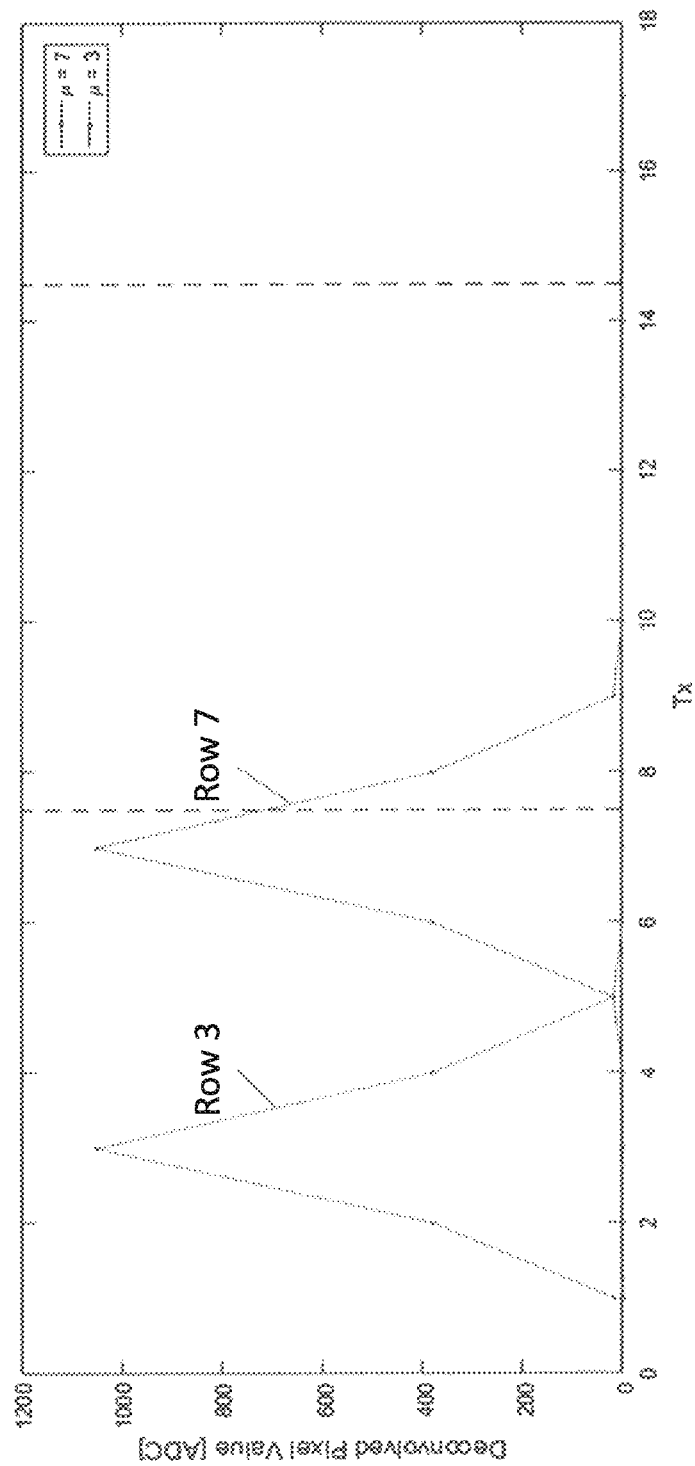
FIG. 7 shows deconvolved profiles of FIG. 6 after performing base level adjustment, according to one or more embodiments.

According to one embodiment, a base level adjustment is performed. For example, the minimum of {0 and all the pixel values within a CDM group} is subtracted from the raw profile for that CDM group. Performing that adjustment to the raw profiles shown in FIG. 6 results in the profiles shown in FIG. 7.

The background image of a touch sensor may have considerable structure, so it may still be necessary to maintain and subtract the raw background image from the finger touching image before applying the base adjustment correction.

The above embodiment uses only the transmitter electrodes of a 2D sensor. In an alternative embodiment, one or more extra non-sensed transmitter electrodes are included above and/or below the active 2D sensing area. All electrodes (including the non-sensed electrodes) are driven with a zero row sum CDM matrix, but the active sensing area is driven by a portion of the CDM matrix that has an inverse, i.e., choose a square submatrix Ms of matrix M that drives active area electrodes but is not mathematically singular. Extra non-sensed electrode(s) may also be operated with a non zero row sum scheme, in which case the extra electrode(s) are used to cancel out the row sum of any CDM matrix acting only on the sensing electrodes within the active area. Such embodiments will be discussed in more detail below.

As above, zero row sum CDM matrices, and in particular odd dimension zero row sum CDM matrices, may be used to reduce radiated emissions from touch sensors. In certain embodiments, the electrode pitch and CDM order are designed to be sufficiently large such that loss of the known constant offset would be irrelevant. According to certain embodiments, a higher order CDM matrix may be used so that it spans a larger distance and/or a smaller CDM matrix may be spread out to span a larger distance, e.g., driving non-contiguous transmitters.

The advantages of CDM matrices include an increase in the Signal-to-Noise Ratio (SNR) by roughly the square root of the CDM order, e.g., sqrt7 improvement for CDM7. The advantages of using zero row sum CDM matrices also includes a reduction in radiated emissions, especially when used in the context of transcapacitive touch sensing. An advantage of interleaving a zero row sum CDM matrix (see, e.g., FIG. 4B) is that objects touching the sensor must be larger by one plus the interleave factor before the single broad peak splits into two narrower peaks.

Figure 8:
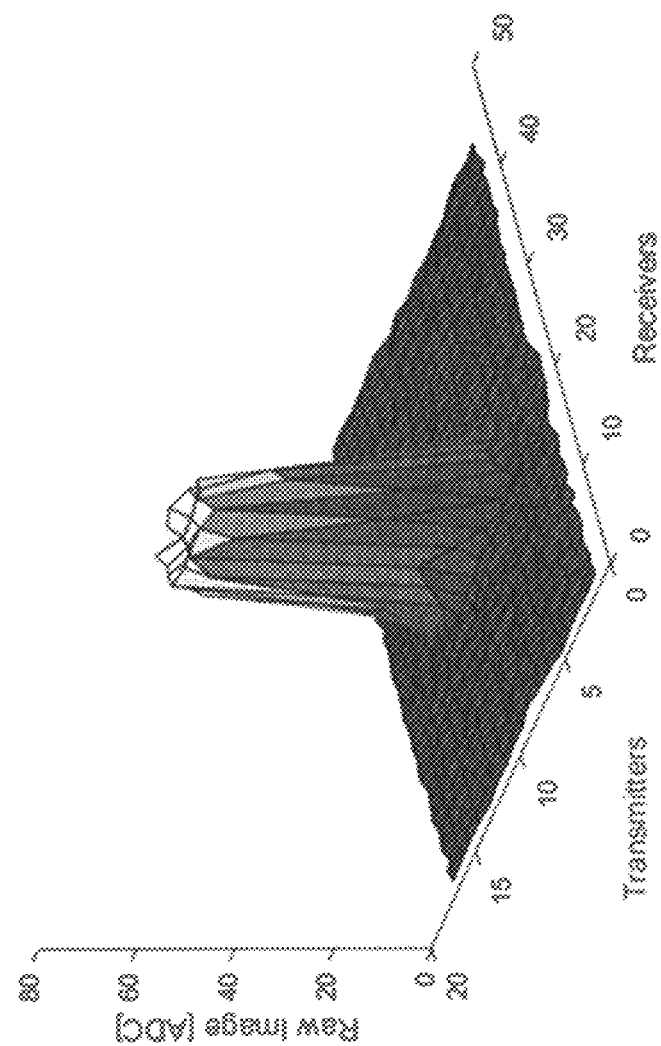
FIG. 8 shows a capacitive sensing image acquired with CDM1 on a touch sensor having 17 transmitters, according to an embodiment.
Figure 9:
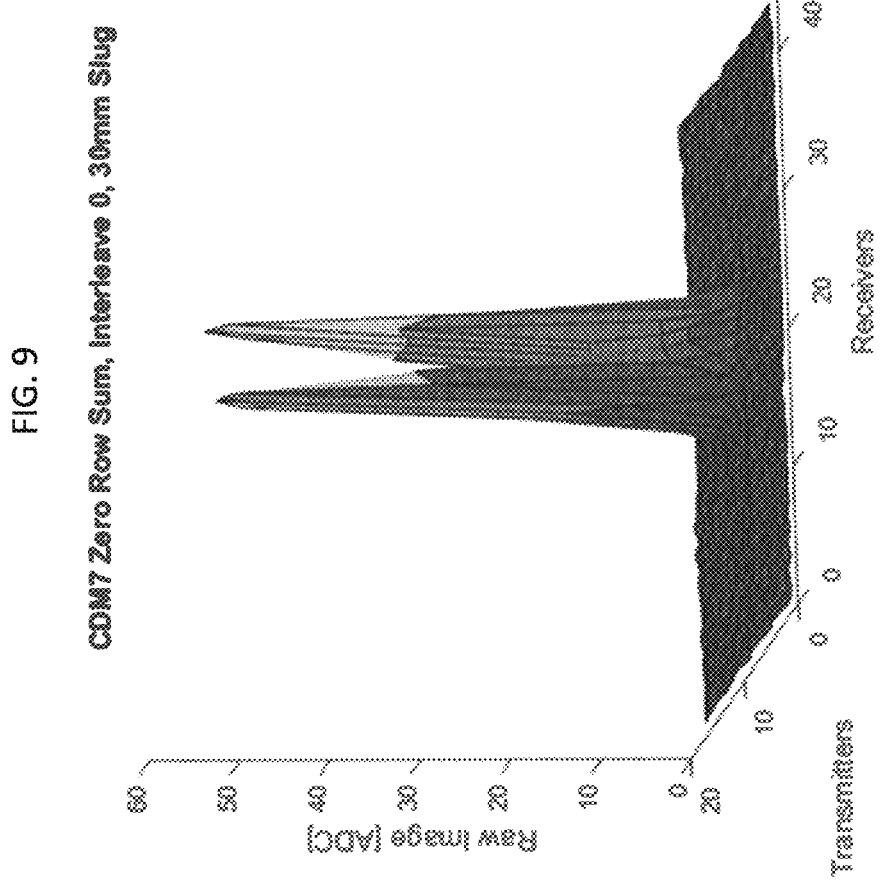
FIG. 9 shows a zero row sum CDM7 deconvolved image, according to an embodiment.
Figure 10:
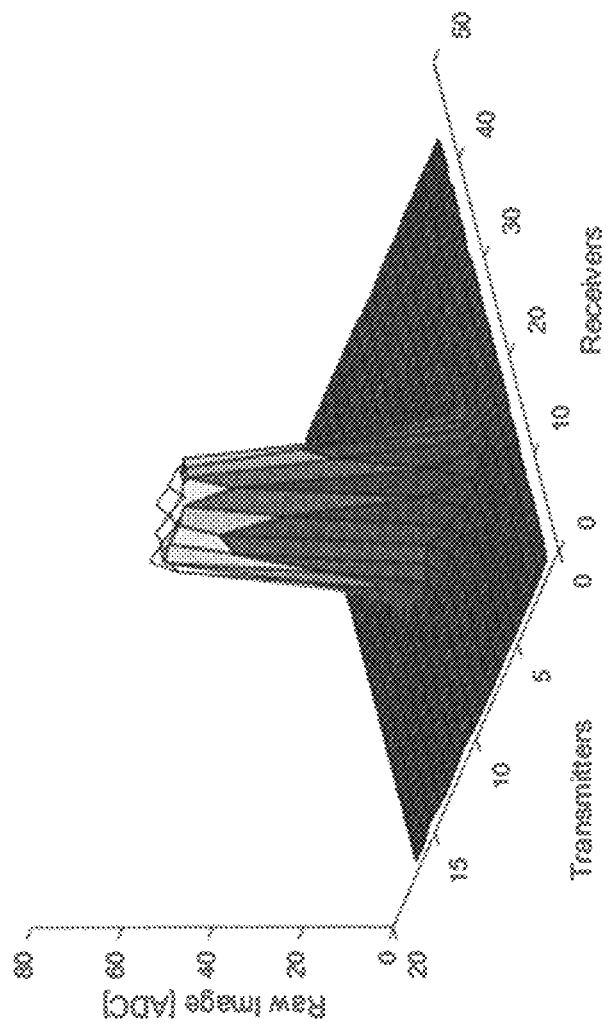
FIG. 10 shows an Interleaved zero row sum CDM7 deconvolved image, according to an embodiment.

Certain differences and advantages are now illustrated with figures. FIG. 8 shows a transcapacitive sensing image acquired with CDM1, i.e., no CDM at all, of a 30 mm slug on a touch sensor having 17 transmitter rows (see, e.g., FIG. 3), according to one or more embodiments. The peak accurately reflects the shape of the slug and subsequent Image Frame Processing (IFP) can correctly classify it as a large object or palm and reject it. FIG. 9 shows zero row sum CDM7 operating on the same system; when appropriately straddling an entire CDM sequence, the deconvolution method splits the single peak into two peaks that are sufficiently spatially resolved such that IFP classifies and reports the two peaks as two fingers. FIG. 10 shows the same system again but running zero row sum CDM7 interleaved with a spacing of 1 (every other transmitter driven for the span of the CDM matrix). The peak is again a single broad peak, which IFP correctly classifies and reports or dismisses. The smoother floor compared to FIG. 8 also underscores the general SNR advantage of using CDM techniques.

Figure 11:
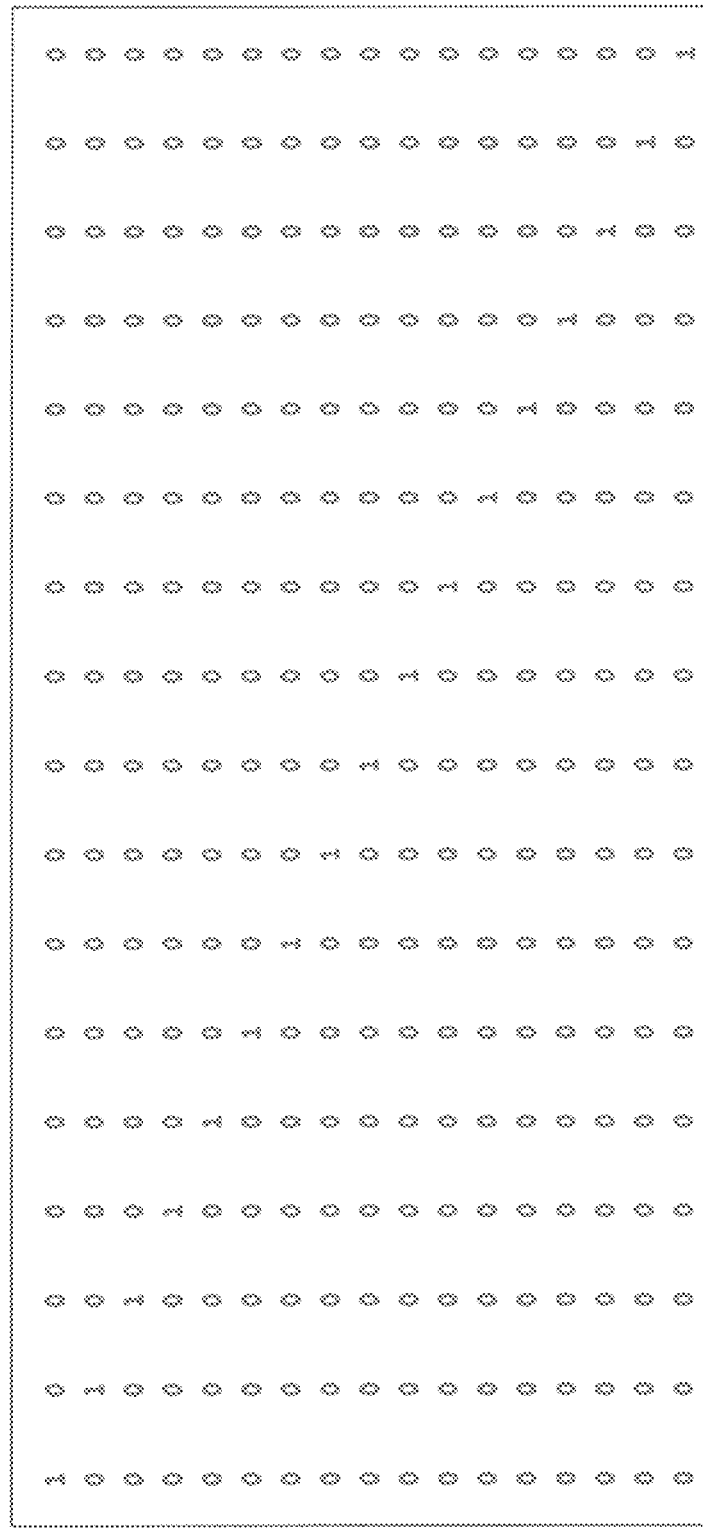
FIG. 11 shows a transmitter control matrix of CDM1 (row at a time) for a 17 transmitter touch sensor, according to an embodiment.
Figure 12:
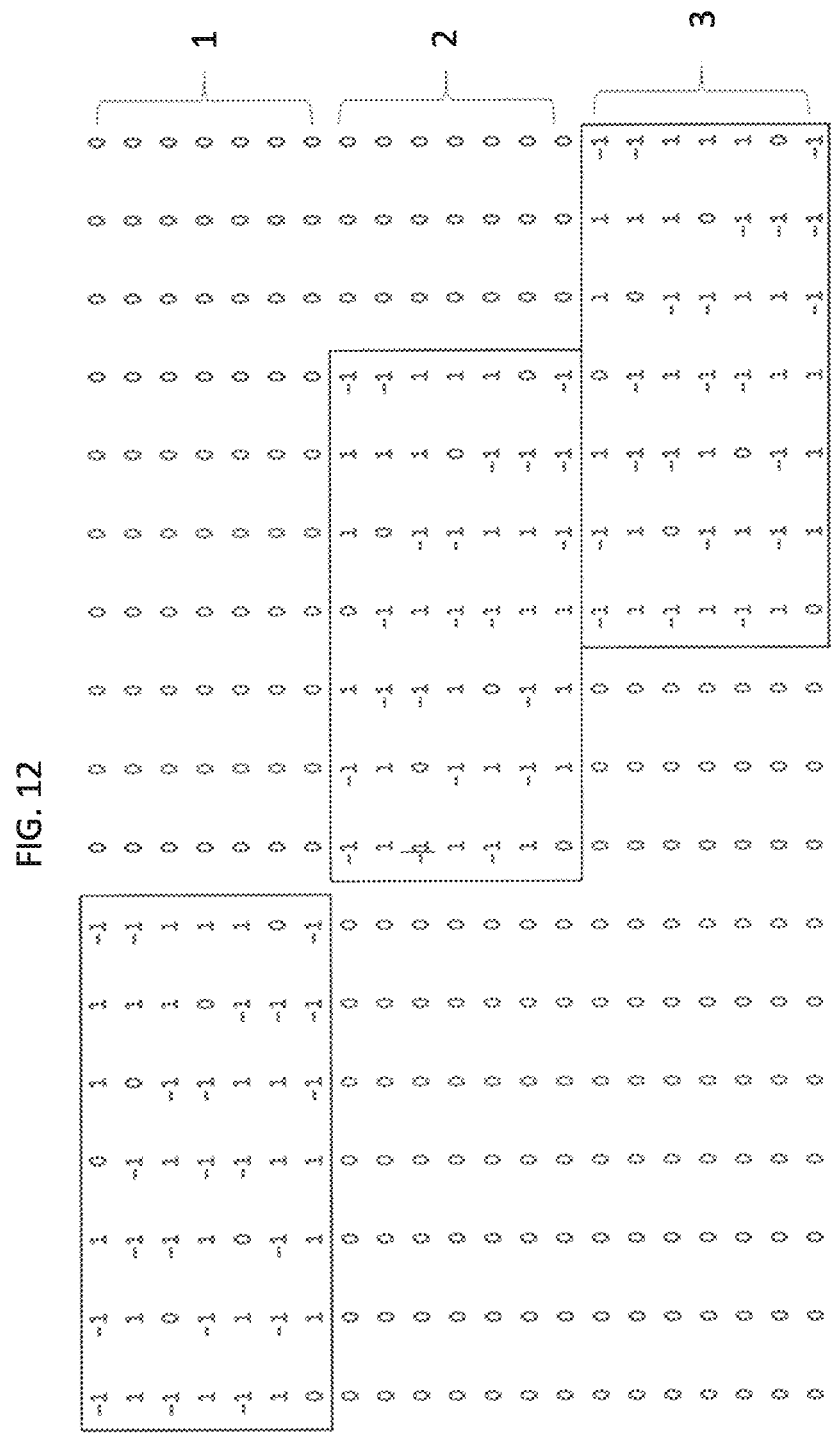
FIG. 12 shows iterations of a non-interleaved zero row sum CDM7 transmitter control matrix for a 17-transmitter touch sensor, according to an embodiment.

FIG. 8 was acquired with the transmitter control matrix (CDM1) of FIG. 11, which is a line-at-a-time CDM1 image sensing scheme, where consecutive rows represent consecutive periods in time, and the columns indicate the polarity (+1 and −1) or not transmitting (0) for each transmitter. FIG. 9 was acquired with the CDM7 transmitter control matrix of FIG. 12, which shows iterations of a non-interleaved zero row sum CDM7 transmitter control matrix for sensing of a 17 transmitter touch sensor (e.g., the upper left 7×7 matrix is a complete CDM7 Zero Row Sum multiplexing iteration). Each row of the CDM7 drive matrix describes how each transmitter is controlled during each drive iteration, with each column corresponding to a distinct and consecutive transmitter. The three drive iterations shown (repeating underlying CDM7 matrix groups) are designated as "1", "2" and "3". In the example shown in FIG. 12, there is an overlap at columns 11, 12, 13 and 14 between two drive iterations.

Figure 13:
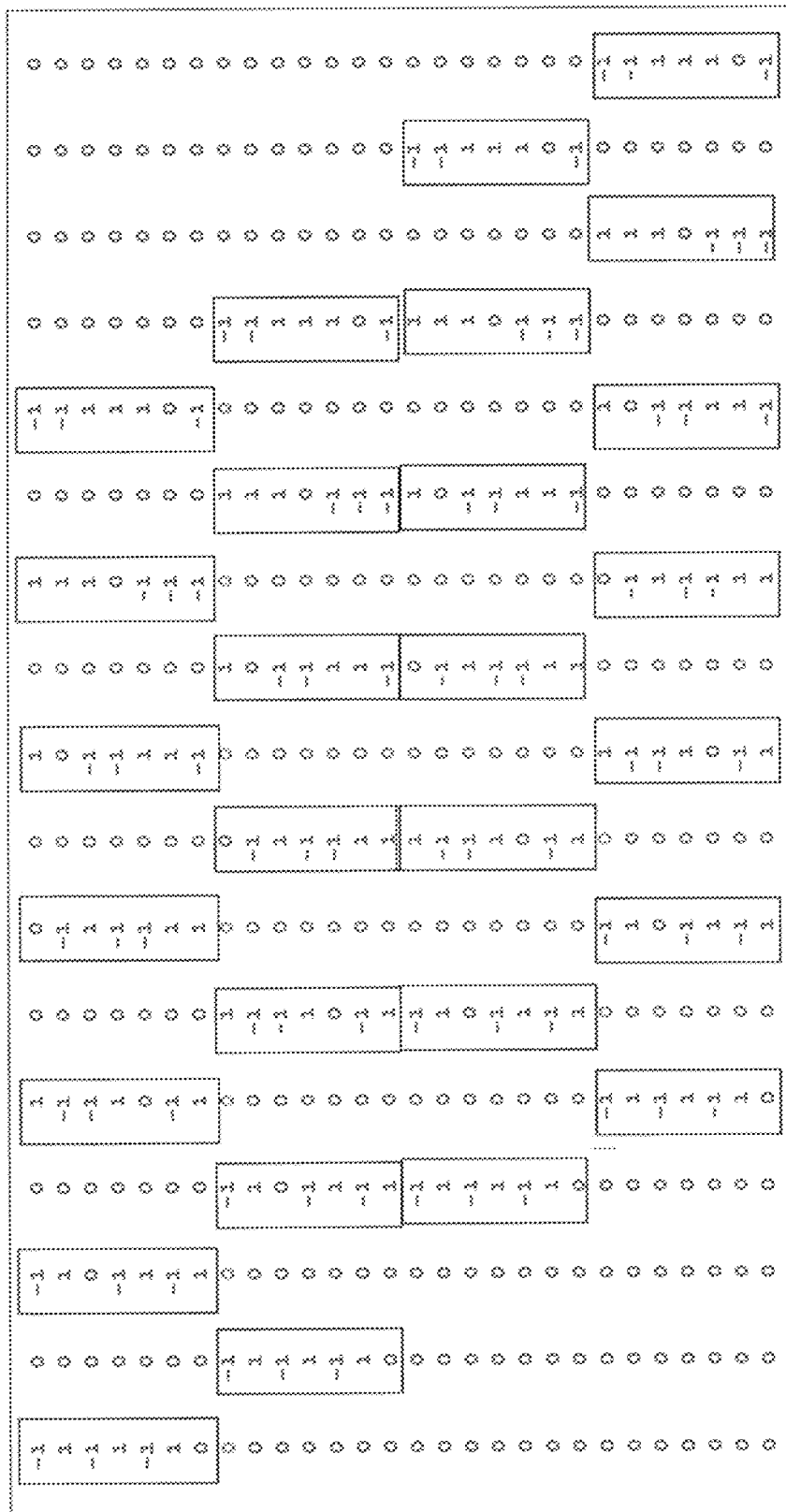
FIG. 13 shows iterations of an interleaved zero row sum CDM7 transmitter control matrix for a 17-transmitter touch sensor, according to an embodiment.

FIG. 10 was acquired with an interleaved CDM7 transmitter control matrix as shown in FIG. 13 which shows iterations of an interleaved zero row sum CDM7 transmitter control matrix for sensing of a 17 transmitter touch sensor (e.g., the upper left 14×7 matrix is a complete CDM7 interleaved zero row sum multiplexing iteration). Now, instead of operating on consecutive transmitters {1-7} the CDM7 matrix is interleaved and now operates on every other transmitter {1, 3, 5, 7, 9, 11, 13} for the first 7 bursts (of the single drive iteration), then on the set of transmitters {2, 4, 6, 8, 10, 12, 14} for the next 7 bursts (for a subsequent drive iteration). This is termed interleave 1 and effectively doubles the spatial span of a CDM group. For measurements to suffer the base correction issue of FIG. 9, the large object must now be twice as large. It should be appreciated that different interleave dimensions or spacings may be used. For example, interleave 2 includes two non-driven transmitters between each driven transmitter, and interleave 3 includes three non-driven transmitters between each driven transmitter. The interleave spacing may be as large as desired. Further, the interleaved spacings may be mixed. As an example, a particular CDM7 drive iteration may control transmitters {1, 3, 6, 8, 11, 13, 16} for a mixed interleave spacing of 1 and 2.

Figure 14:
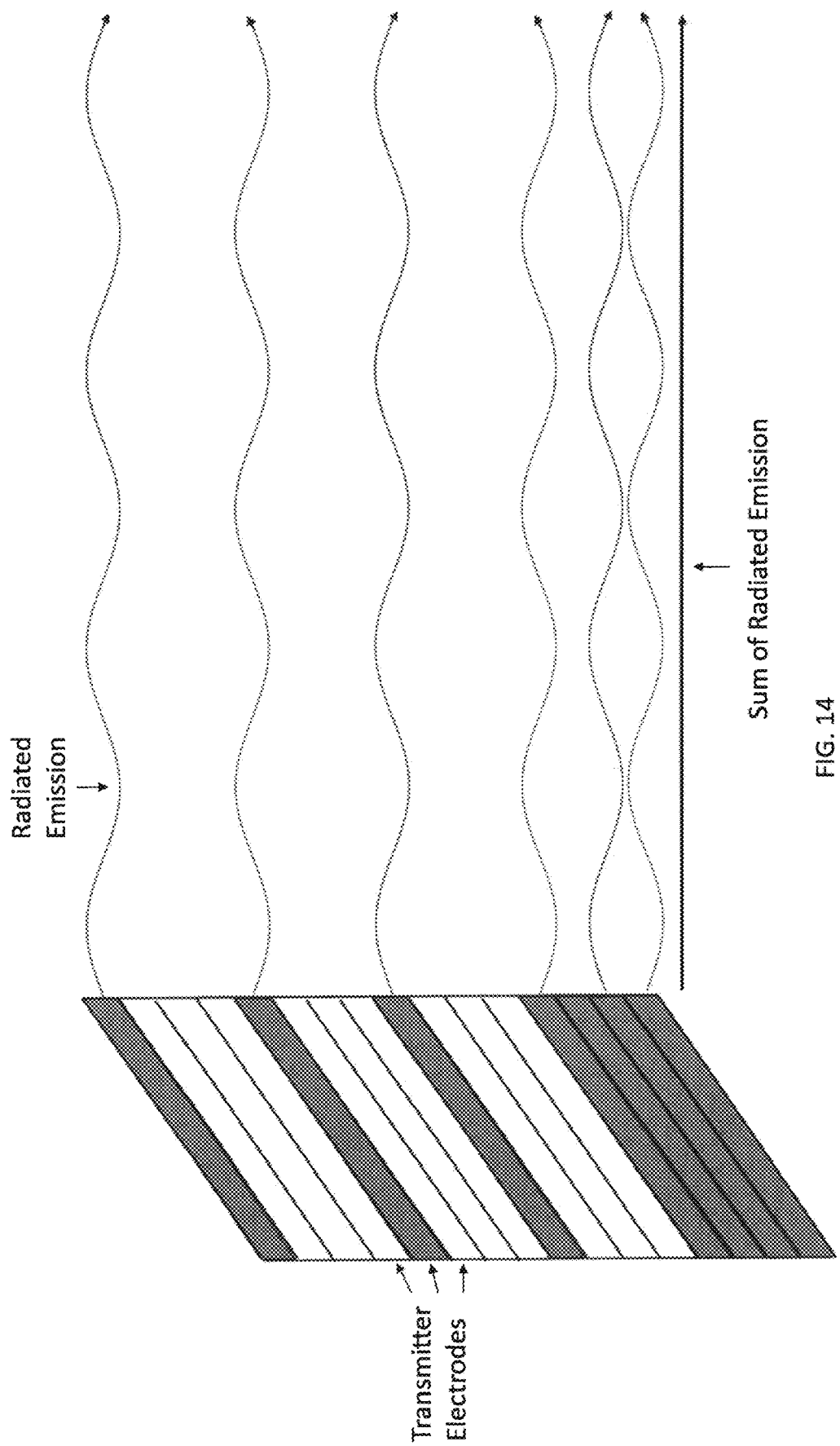
FIG. 14 shows an example interleaved zero row sum CDM7 driving scheme where an interleave dimension of three would normally span more transmitters than the sensor possesses, according to one or more embodiments.
Figure 15:
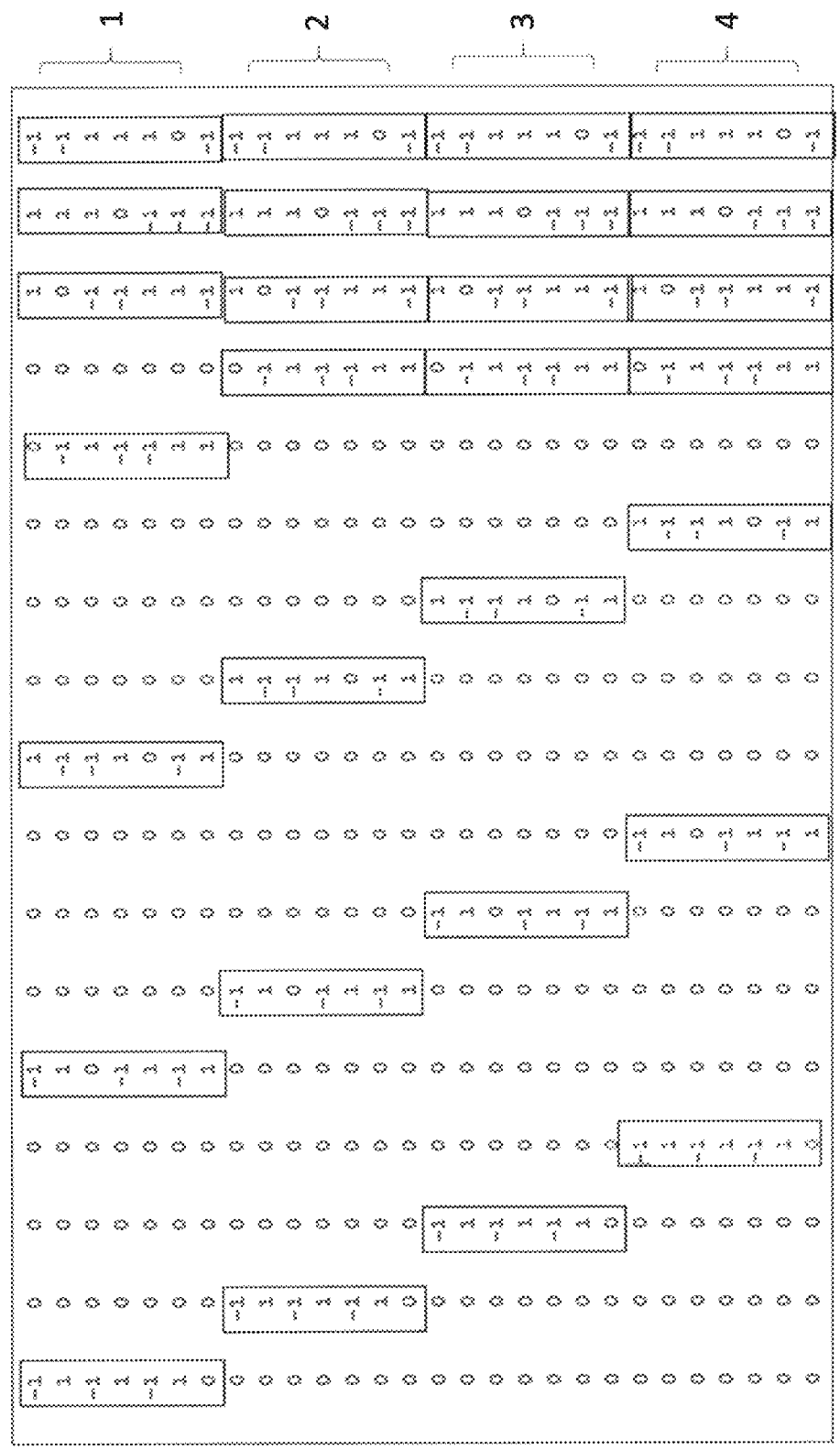
FIG. 15 shows an interleaved zero row sum CDM7 transmitter control matrix for a 17 transmitter touch sensor, according to an embodiment when the interleave dimension is 3.

The uniform spacing and general structure of the driving matrix in FIG. 13 is esthetically appealing; however, the driving matrix need not be balanced in any way. For example, an interleave 3 (interleave of three) would normally generate a driving matrix having more columns than the 17 transmitters used in the present example. This interleave can still be used by bundling or compressing the last portion of the driving scheme (e.g., CDM7 driving scheme) in the last few transmitters of the actual sensor in an embodiment. An example is illustrated in FIG. 14. The full set of driving matrix iterations becomes that shown in FIG. 15, which shows an interleaved zero row sum CDM7 transmitter control matrix for transcapacitive sensing applied to a 17 transmitter touch sensor when the interleave is 3; the four CDM7 iteration sequences are designated by "1", "2", "3" and "4". It should be appreciated that the bundling/compressing does not have to happen at the right end of the matrix as shown; any particular CDM iteration or sequence can be spread about in any manner as long as all the sets of {column, rows}, i.e., a complete underlying CDM matrix, span the entire driving matrix. It should be further appreciated that the driving matrix of FIG. 13 requires 28 sensing bursts (4 iterations at 7 bursts per iteration), but since the third CDM7 sequence ("3") largely overlaps the second sequence ("2") it can be compressed to the right to completely fill the last three columns and any other arbitrary 4 columns. Now only three CDM iterations are required to completely cover the driving matrix (physical sensor) so the fourth (e.g., last iteration; "4", in FIG. 15) can be eliminated, reducing the required bursts to 21 as in the FIG. 12 non-interleaved driving scheme.

In general, a driving matrix such as any of FIG. 11, 12, 13 or 15, can be applied to any permutation of columns or rows and still be usable.

Figure 16:
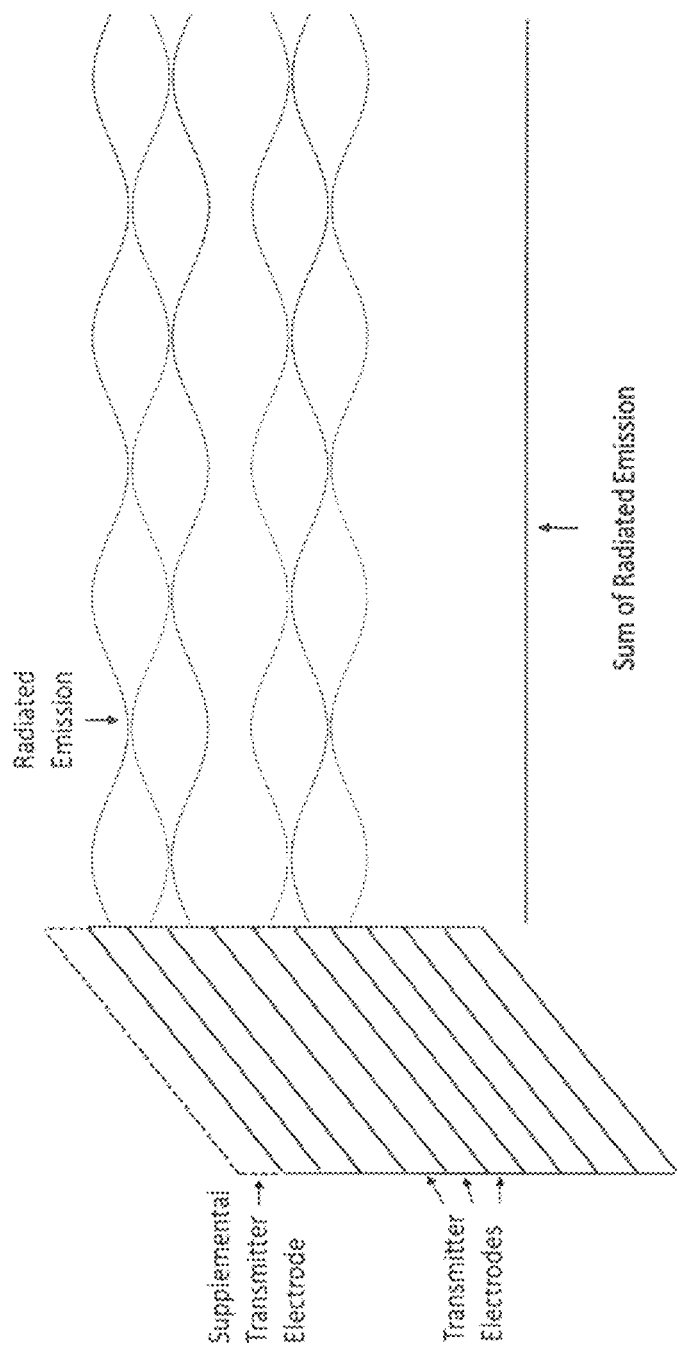
FIG. 16 illustrate a supplementary transmitter electrode for radiated emission mitigation according to an embodiment.

As discussed above, the use of zero row sum CDM matrices, including odd dimension zero row sum CDM matrices, advantageously reduces, mitigates and/or suppresses radiated emissions from touch sensors, e.g., sensors used in automotive and other applications. In one embodiment, one or more additional non-sensed transmitter electrodes are provided for touch sensing so that non zero row sum CDM matrices can be used. FIG. 16 shows a set of transmitter electrodes with a supplemental (non-sensed) transmitter electrode (at top) according to an embodiment. The advantages of matrices in general include an increase in SNR by roughly the square root of the CDM order. The advantages of zero row sum CDM matrices include that they reduce the radiated emissions, e.g., when used in the context of transcapacitive touch sensing, by driving an equal number of transmitter electrodes in opposite phase so that radiated emissions (or capacitive coupling to an antenna) are mitigated or suppressed completely, e.g., sum to zero. In the present embodiment, the actual (e.g., active) transmitter electrodes are supplemented with one or more non-sensed electrodes that serve to allow the total transmitter driving sum to become zero to retain the low radiated emission characteristics and also to allow non zero row sum measurements within the active 2D sensing area to retain the robustness of invertible matrices by not affecting the 2D measurement.

The simplest realization is the case of CDM1 (essentially no CDM; it is classic row-at-a-time transmitter driving scheme). A CDM1 driving matrix applied to a 17 transmitter touch sensor is shown in FIG. 11. Because the row sum of that matrix is 1, the addition of a single off-sensor active area transmitter electrode (i.e., non-sensed; meaning not intersecting any active column receivers) always driven in the opposite polarity results in a zero row sum radiated emission but simultaneously the classic row sum 1 receiver measurements (FIG. 16 shows an example of a supplemental electrode at top). The deconvolution of the measured raw data is unnecessary (i.e., already done) and allows complete recovery of the per-pixel trans-capacitance.

For example, for CDM7 row sum one, the addition of a single extra transmitter electrode would be useful. For CDM4 with a row sum of 2, the addition of two supplemental transmitter electrodes, at the top and bottom of the sensor, for example, would allow that matrix to be run with a zero row sum emission characteristic but still be fully invertible to allow complete trans-capacitance information to be extracted. Alternatively, driving a single supplemental electrode at twice the amplitude in opposite phase is equivalent, as would using a single supplemental transmitter electrode of a larger geometry and driving at the same amplitude but opposite phase.

The various embodiments herein are useful for square wave sensing, sine wave sensing or any sensing modulation/shaping pattern.

It will be appreciated that each row of the drive matrix corresponds to a different imaging or driving iteration of the respective CDM group, and that the rows may be rearranged to be performed in any order. It will also be appreciated that the same drive matrix may be used for each respective CDM group. Further, it will be appreciated that the various imaging iterations may be performed in any order.

Figure 17:
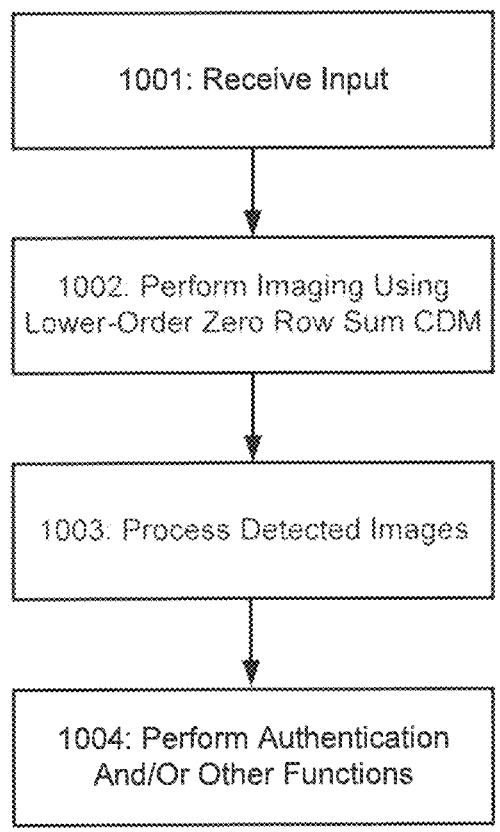
FIG. 17 is a flowchart depicting a process using lower-order zero row sum CDM according to an embodiment.

FIG. 17 is a flowchart depicting an example process for using an input device. At stage 1001, an input, such as a biometric object (e.g., a finger) and a stylus, is received at a sensing region of the input device. At stage 1002, imaging is performed by the input device using lower-order CDM, for example, using a plurality of contiguous or non-contiguous zero row sum CDM groups. The performed imaging may include, for example, a processing system decoding information obtained using the lower-order CDM techniques by using the inverse or transpose of a drive matrix corresponding to a CDM group. At stage 1003, the detected image may be optionally processed further, if appropriate. Then, at stage 1004, functions (such as touch sensing, navigation functions, authentication, etc.) are performed by the processing system based on the detected and/or processed image.

It will be appreciated that although the illustrative examples discussed above are provided in the context of capacitive input devices, the principles described herein may also be applied to other types of input devices, such as acoustic or ultrasonic input devices, which also utilize transmitters and receivers. For example, the transmitters of an acoustic or ultrasonic input device may also be driven over multiple iterations using a lower-order CDM technique having non-contiguous CDM groups.

U.S. patent application Ser. No. 15/720,817, filed Sep. 29, 2017, which is incorporated herein by reference, discloses various aspects of input sensing using lower order CDM drive matrices.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of input sensing using an input device, the method comprising:
   receiving, at a sensing region of the input device, an input; and
   obtaining, via receivers of the input device, measurements corresponding to the input, wherein obtaining the measurements comprises: driving multiple subsets of transmitters of the input device, and obtaining measurements corresponding to each driven subset of transmitters via the receivers, wherein a plurality of measurement iterations are performed for each driven subset of transmitters, the plurality of measurement iterations corresponding to a zero row sum code division multiplexing (CDM) drive matrix for the driven subsets of transmitters, wherein the same zero row sum CDM drive matrix is used when driving the multiple driven subsets of transmitters.

2. The method of claim 1, wherein each driven subset of transmitters comprises a plurality of non-contiguous transmitters.

3. The method of claim 2, wherein at least one driven subset of transmitters includes at least two contiguous transmitters.

4. The method of claim 1, wherein the zero row sum CDM drive matrix has an odd dimension.

5. The method of claim 1, wherein none of the driven subsets of transmitters includes a same transmitter.

6. The method according to claim 1, further comprising generating, by a processing system, an image of the input based on the obtained measurements, wherein the generating the image includes decoding the obtained measurements corresponding to each driven subset of transmitters using the inverse or transpose of the zero row sum CDM drive matrix for the driven subset of transmitters to obtain image information.

7. The method of claim 1, wherein the input device includes a transcapacitive input device and wherein the transmitters are transmitter electrodes, and the receivers are receiver electrodes.

8. The method of claim 1, wherein all measurement iterations for a first driven subset of transmitters are performed before any measurement iterations for a second driven subset of transmitters are performed.

9. The method of claim 1, wherein at least one of the multiple subsets of transmitters of the input device includes a non-sensed transmitter.

10. An input device for sensing a biometric object, the input device comprising:
a surface corresponding to a sensing region, wherein the sensing region is configured to receive an input;
transmitters, configured to be driven with transmitter signals; and
receivers, configured to obtain measurements corresponding to the input, wherein obtaining the measurements comprises: obtaining measurements corresponding to driven subsets of the transmitters via the receivers, wherein a plurality of measurement iterations are performed for each driven subset of the transmitters, the plurality of measurement iterations corresponding to a zero row sum code division multiplexing (CDM) drive matrix for the driven subsets of the transmitters, wherein the same zero row sum CDM drive matrix is used when driving the multiple driven subsets of transmitters.

11. The input device of claim 10, wherein each driven subset of the transmitters comprises a plurality of non-contiguous transmitters.

12. The input device of claim 10, further comprising a processing system configured to generate an image of the input based on the obtained measurements, wherein the processing system is configured to generate the image by decoding the obtained measurements corresponding to each driven subset of transmitters using the inverse or transpose of the zero row sum CDM drive matrix for the driven subset of transmitters to obtain image information.

13. The input device of claim 10, wherein the input device is a transcapacitive input device, the transmitters are transmitter electrodes, and the receivers are receiver electrodes.

14. The input device of claim 13, wherein the transmitter electrodes include at least one transmitter electrode that does not overlap the receiver electrodes.

15. The input device of claim 10, wherein the transmitters are orthogonal to the receivers.

16. A non-transitory computer-readable medium having processor-executable instructions stored thereon for performing input sensing using an input device, the processor-executable instructions, when executed by a processing system, enable the processing system to implement the following method:
obtaining, via receivers of the input device, measurements corresponding to an input received at a sensing region of the input device, wherein obtaining the measurements comprises: driving multiple subsets of transmitters of the input device, and obtaining measurements corresponding to each driven subset of transmitters via the receivers, wherein a plurality of measurement iterations are performed for each driven subset of transmitters, the plurality of measurement iterations corresponding to a zero row sum code division multiplexing (CDM) drive matrix for the driven subsets of transmitters, wherein the same zero row sum CDM drive matrix is used when driving the multiple driven subsets of transmitters; and
generating an image of the input based on the obtained measurements.

17. The non-transitory computer-readable medium of claim 16, wherein the generating the image includes decoding the obtained measurements corresponding to each driven subset of transmitters using the inverse or transpose of the zero row sum CDM drive matrix for the driven subset of transmitters to obtain image information.

18. The non-transitory computer-readable medium of claim 16, wherein the zero row sum CDM drive matrix has an odd dimension.

19. The non-transitory computer-readable medium of claim 16, wherein the input device is a transcapacitive input device, the transmitters are transmitter electrodes, and the receivers are receiver electrodes.

20. A method of input sensing using an input device, the method comprising:
receiving, at a sensing region of the input device, an input; and
obtaining, via receivers of the input device, measurements corresponding to the input, wherein obtaining the measurements comprises: driving multiple subsets of transmitters of the input device, and obtaining measurements corresponding to each driven subset of transmitters via the receivers, wherein a plurality of measurement iterations are performed for each driven subset of transmitters, the plurality of measurement iterations corresponding to a zero row sum code division multiplexing (CDM) drive matrix for the driven subsets of transmitters, wherein at least one of the multiple subsets of transmitters of the input device includes a non-sensed transmitter.

21. An input device for sensing a biometric object, the input device comprising: a surface corresponding to a sensing region, wherein the sensing region is configured to receive an input; transmitters, configured to be driven with transmitter signals; and receivers, configured to obtain measurements corresponding to the input, wherein obtaining the measurements comprises: obtaining measurements corresponding to driven subsets of the transmitters via the receivers, wherein a plurality of measurement iterations are performed for each driven subset of the transmitters, the plurality of measurement iterations corresponding to a zero row sum code division multiplexing (CDM) drive matrix for the driven subsets of the transmitters, wherein the transmitters includes at least one transmitter electrode that does not overlap receiver electrodes.

* * * * *